United States Patent [19]

Sague

[11] Patent Number: 4,906,113

[45] Date of Patent: Mar. 6, 1990

[54] SLEW RING BEARING

[75] Inventor: John E. Sague, Philadelphia, Pa.

[73] Assignee: Quintette Coal Limited, Tumbler Ridge, Canada

[21] Appl. No.: 224,898

[22] Filed: Jul. 27, 1988

[51] Int. Cl.$^4$ .................... F16C 19/30; F16C 19/40
[52] U.S. Cl. ................... 384/618; 384/507; 384/551; 384/619
[58] Field of Search ............... 384/447, 448, 451, 455, 384/507, 508, 520, 548, 551, 569, 582, 593, 608, 618, 619, 621, 622

[56] References Cited

U.S. PATENT DOCUMENTS

| | | | |
|---|---|---|---|
| 2,008,378 | 7/1935 | Witte | 384/551 |
| 3,814,488 | 6/1974 | Rood | 384/619 X |
| 3,948,578 | 4/1976 | Martin | 384/582 |
| 3,967,867 | 7/1976 | Richardson | 384/582 |

FOREIGN PATENT DOCUMENTS 3423433  1/1986  Fed. Rep. of Germany ...... 384/593

Primary Examiner—Thomas R. Hannon
Attorney, Agent, or Firm—Seed and Berry

[57] ABSTRACT

A slew ring bearing for coupling the superstructure of a large piece of heavy equipment to the base having an inner ring attachable to the underside of the superstructure and an outer ring having gear teeth on its outer cylindrical surface concentric with the inner ring and attachable to a stationary base frame. An upper and lower V-groove are found in an outer cylindrical face of the inner ring. Corresponding upper and lower V-grooves are formed on an inner cylindrical face of the outer ring positioned opposite corresponding upper and lower V-grooves on the inner ring so as to form in combination therewith associated upper and lower roller bearing raceways. A plurality of rolling elements are positioned in the upper and lower raceways so as to permit rotation of the inner ring relative to the outer ring. A plurality of bronze spacers are positioned with one spacer between each pair of rollers.

13 Claims, 5 Drawing Sheets

PRIOR ART

SLEW RING BEARING

BACKGROUND OF THE INVENTION

The present invention relates to a slew-ring bearing for application to heavy equipment such as large excavators.

Large hydraulic excavators used for digging rock such as in coal beds utilize a large bearing called a slew ring bearing for rotatably coupling a large superstructure to a base frame seated on the ground. A shovel or bucket is pivotally attached to the distal end of an articulating boom that is pivotally fastened to the superstructure. Pinion gears fixed to the superstructure engage gear teeth on an outer ring of the slew ring. The outer ring is affixed to the base frame and coupled to an inner ring attached to the superstructure by rows of cylindrical rolling elements (rollers). The conventional slew ring used has 3 rows of rollers; upper and lower ones whose axes of rotation are horizontal and an intermediate one whose axis of rotation is vertical. Downward (vertical) or thrust loads are resisted by rollers in the upper row. Radial or horizontal loads are taken by the intermediate row of rollers while the lower row of rollers, termed the retaining or lift row, prevents tipping by resisting the vertically upward thrust caused thereby.

It was found in a particular application of such bearings in Northern locations where applied movement loads (force x distance) caused by excavator bucket operation reached 15 million foot pounds, that conventional slew ring bearings failed after an average of only 6,100 hours of operation. Some failures occurred after only 800 hours. Acceptable lifetimes between failure are in the range of 20,000 to 30,000 hours. A detailed two year study into the causes of such premature failure pointed to several contributing factors. A first area of concern was in the configuration of the rollers. Since the applied loads are generally either vertical or horizontal, horizontal loads are taken by the intermediate row of rollers, downward loads by the upper row of rollers and upward thrusts caused by tipping movements applied to the inner ring are taken by the lower set of rollers. The study determined that there were two problems with the design having three rows of rollers. First, the entire downward vertical thrust is taken by only one row of rollers. SeCond, the requirement of fitting three rows of rollers into grooves in the inner ring limits the maximum size of the rollers and decreases reliability due to having a greater number of components as well as relatively small rollers.

Another problem had to do with the tendency of the rollers themselves to become damaged and the precision ground raceways to be scratched, scored or galled as a result. Furthermore, on the existing design there is no positive way of predicting or anticipating catastrophic failure in the form of cessation of rotation and scheduling maintenance without shutting down the machine entirely together with other activities dependent on machine operation.

Finally, distortion of the inner ring was thought to be an important contributing factor of failure causing uneven load distribution with large and disproportionate loads on selected rollers being a result.

Unfortunately, replacement or repair of the slew ring in an excavation takes several days as the entire assembly must be disassembled to change the bearing.

Accordingly, it is an object of the present invention to provide an improved slew ring bearing design. More particularly, it is an object to provide a slew ring bearing design with improved reliability and longer operating life.

It is a further object of the invention to provide a slew ring bearing design which can better withstand distortion and changing loads.

It is yet a further object of the invention to provide a slew ring bearing with a means for easily inspecting, removing and replacing rollers and spacers if necessary.

SUMMARY OF THE INVENTION

According to the invention there is provided a ring bearing which includes an inner ring, an outer ring concentric with the inner ring and upper and lower raceways formed around the interface between the inner and outer rings. A plurality of rollers are positioned in the upper and lower raceways so as to permit rotation of the outer ring relative to the inner ring. An inspection port is formed in one of the inner and outer rings radially directed and intercepting one of the upper and lower raceways.

Preferably, the rollers are separate from one another by bronze spacers with one spacer being positioned between each adjacent pair of rollers.

Advantageously, the diameter of the inspection port is equal to the width of the raceway it intercepts. A plug is slidably insertable into the port and has an end surface which forms a continuous surface with the surface of the intercepted raceway.

The upper and lower raceways may each be formed by an upper and lower V-groove formed in an outer cylindrical face of the inner ring and corresponding upper and lower V-grooves formed on an inner cylindrical face of said outer ring. The latter V-grooves are positioned opposite the corresponding upper and lower V-grooves on the inner ring so as to form, in combination, the upper and lower raceways.

An inspection port aforesaid may be provided for each of the raceways, each with a plug also as indicated above.

The rollers may be substantially cylindrical with a crown formed thereon and with the diameter decreasing gradually from the center to the ends thereof by an amount sufficient to prevent stress concentration at the ends of the roller. The angle between the axes of rotation of the rollers in the upper and lower raceways may be 90°.

The inspection ports are dimensioned so as to allow for periodic inspection of the bearings, raceways and spacers and to permit insertion and removable of the bearings without having to disassemble an attached superstructure to which the bearing is usually attached. Removal of the plug and slow rotation of the inner ring allows inspection of each rolling element for damage or other harmful indications. In this way signs of distress can be detected at their inception and maintenance scheduled whenever convenient without incurring significant downtime.

By utilizing rollers oriented in the above way sharing of horizontal and vertical loads between rollers of horizontal and vertical loads occurs. Moreover, it is possible to make the rollers bigger given that only 2 rows are employed and the fact that the grooves extend into both the outer ring and the inner ring.

Employing bronze roller carriers having concavities that conform to the cylindrical shape of the rolling elements to space apart adjacent rollers ensures better lubrication of the rollers and raceway than is achievable with other shapes or designs of spacers or with other materials such as nylon or plastic. Bronze provides higher tensile and compressive strength than nylon or plastic and hence can withstand better the forces between rollers which are known to be extremely high in many circumstances. Conventional carriers or spacers which utilize plastic or nylon tend to flow under pressure or tension and permit misalignment and damage to the rollers and raceways. The inadequate design of existing spacers aggravates the latter problem. Bronze roller carriers heretofore have been used only on special high capacity standard bearings such as those for machine tools and have never been applied to a large slew ring bearing such as the one herein. Ordinarily, plastic or steel have been used in the latter application.

Distortion of the inner and outer rings becomes more serious as the ratio of ring height to wall thickness increases. By decreasing that ratio concurrent with increasing mounting bolt diameter a more rigid assembly is achieved.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS.

Figure 1:
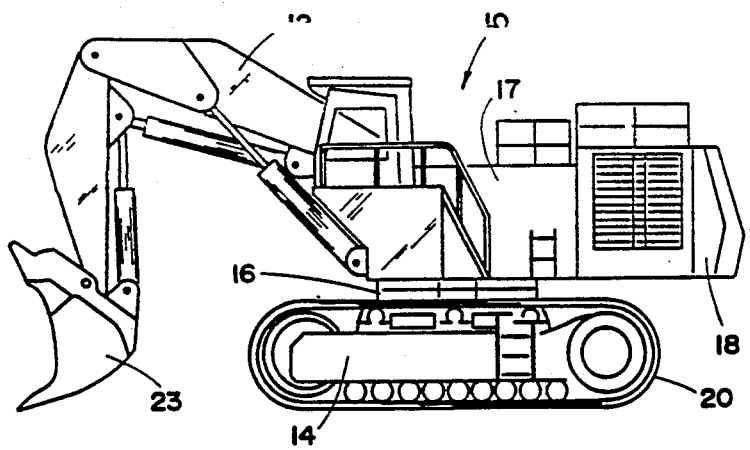
FIG. 1 is a perspective view of an excavator which uses a slew ring bearing to couple its superstructure to its base.

Referring to FIG. 1 there is shown a large excavator 10 having a base frame 14 supported by a pair of tractor treads 20. A superstructure 17 is supported on the base 14 and coupled thereto by a slew ring bearing 16. The superstructure 17 has an articulating boom 12 pivotally attached thereto and driven by hydraulic piston cylinders. At the distal end of boom 12 there is journalled a bucket 23. A counterweight 18 opposite the boom 12 offsets the weight of the latter. The superstructure 17 rotates while the base frame 14 is stationary.

Figure 2:
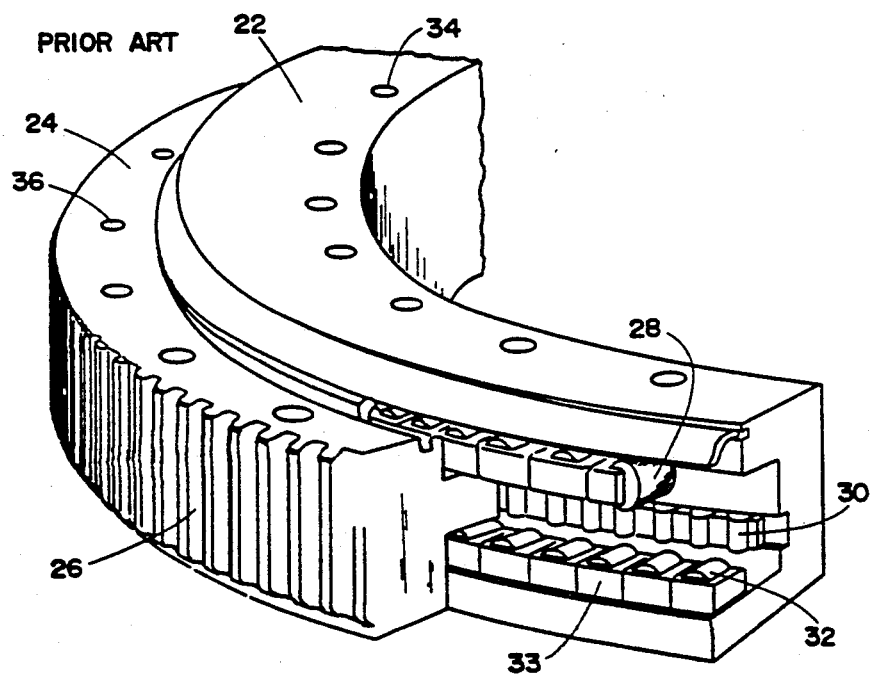
FIG. 2 is a perspective view of a slew ring bearing of conventional design.

Referring to FIG. 2 there is shown a slew ring bearing 16 presently in common use. The latter bearing consists of an inner ring 22 having a plurality of regularly spaced bolt holes 34 therethrough. On the cylindrical periphery there is cylindrical receptacle having three bearing surfaces two of which are horizontal and one of which is vertical. The inner ring 22 is concentric with and enclosed by an outer ring 24 having gear teeth 26 on its outer cylindrical perphery. A plurality of bolt holes 36 are also regularly spaced around the outer ring 24 extending from a top to a bottom surface thereof. The inner cylindrical surface of the outer ring 24 has an inwardly projecting cylindrical shoulder with 3 bearing surfaces thereon opposite to the corresponding three bearing surfaces on the inner ring 22 forming three roller bearing raceways for rollers 28, 30 and 32. Each roller is located in an opening within a box-shaped spacer 33.

Figure 3:
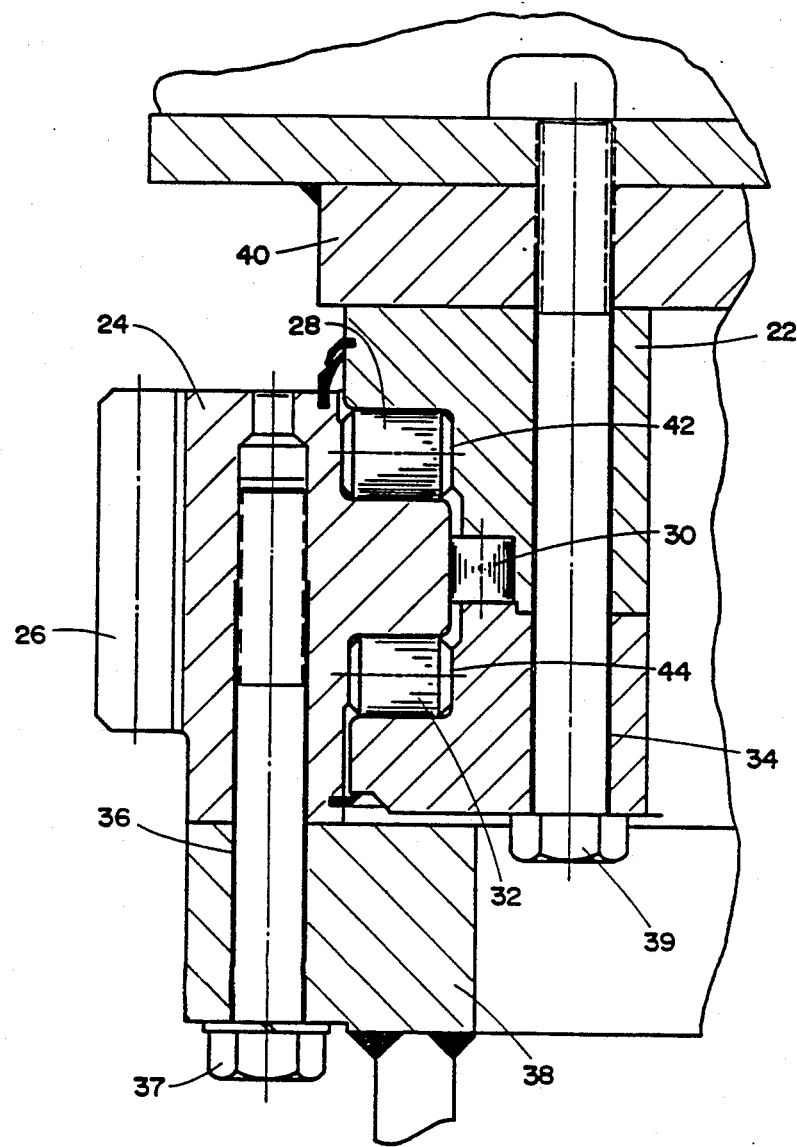
FIG. 3 shows a cross-sectional view of the bearing of FIG. 2.

Referring to FIG. 3 the structure of the prior art is shown in more detail and consists of an upper row of horizontal rollers 28, a lower row of horizontal rollers 32 and a row of vertical rollers 30. The rows of rollers 28, 30 and 32 are captured in raceways formed by the opposed surfaces of the inner ring 22 and the outer ring 24. The rollers in rows 28, 30 and 32 are each placed in a plastic box-like container sequentially spaced around the raceways 42, 43 and 44, respectively. The outer ring 24 is fastened to a base frame 38 by means of bolts 37 passing through bolt hole 36 and registering with threaded surfaces therein. Similarly, the inner ring 22 is fastened to a superstructure 40 by means of bolts 39 passing through bolt holes 34 and registering with threads in the superstructure.

Figure 4A:
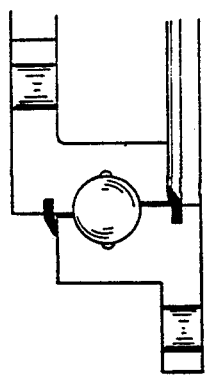
FIGS. 4A–4I show a few typical known bearing designs.
Figure 4B:
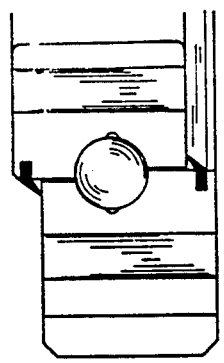
Figure 4C:
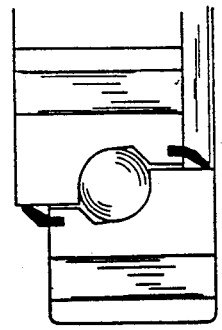
Figure 4D:
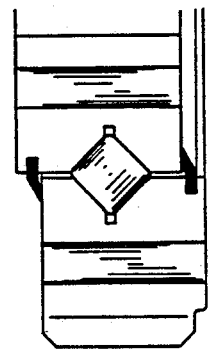
Figure 4E:
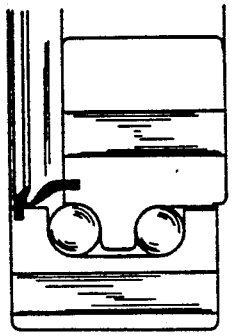
Figure 4F:
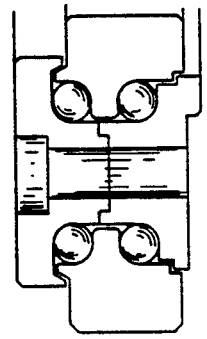
Figure 4G:
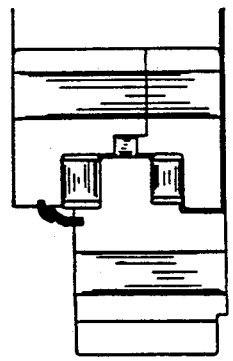
Figure 4H:
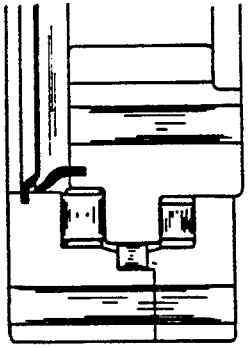
Figure 4I:
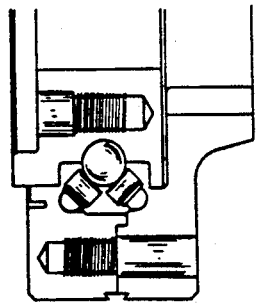

A few other known arrangements of roller bearings are shown in FIGS. 4A to 4I. FIG. 4A is a single-row ball bearing slew ring used for lower carrying capacity. FIG. 4B is also a single-row ball bearing slew ring but capable of handling medium forces such as in overhead cranes and turntables of various descriptions. FIG. 4c shows a single-row ball bearing slew ring as a self-contained thrust bearing where the loading is predominantly thrust. FIG. 4D illustrates a cross-roller bearing which can be used for a variety of applications similar to all the above. FIG. 4E is a double-row-ball bearing slew ring shown with internal gearing. Such rings as shown in FIG. 4E are very strong and have been successfully used in excavators, cranes and other machines which experience constantly changing working loads. The four-row ball bearing slew rings are seen in FIG. 4F allow two independent structural components to revolve on a common foundation. FIGS. 4G and 4H show three row roller bearings with external and internal gears, respectively. The bearing of FIG. 4G is the same as that of FIG. 2 and 3. Finally, FIG. 4I is a wire race bearing with two rows of rollers. Here rolling motion occurs between anti-friction elements and hardened raceway wires of great hardness.

Figure 5:
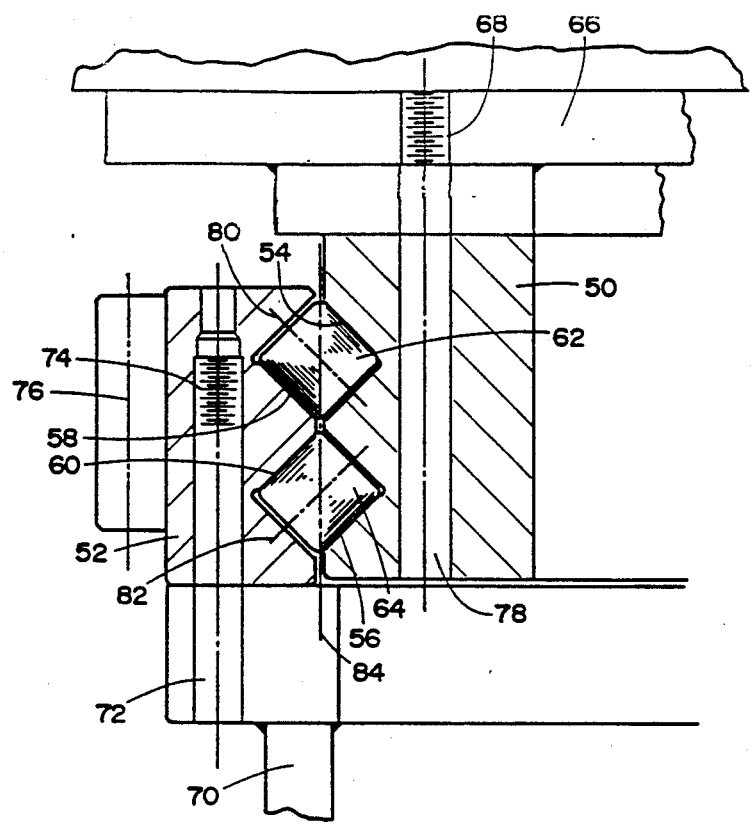
FIG. 5 is a cross sectional view of the bearing in accordance with a preferred embodiment of the invention.

The bearing design according to the present invention is shown in FIG. 5 as consisting of an inner ring 50 having upper and lower V-grooves 54 and 56, respectively, in the outer cylindrical surface thereof. The sum of the width of these V-grooves is approximately 70% of the height of the outer ring. Concentrically enclosing the inner ring 50 is an outer ring 52 having upper and lower V-grooves 58 and 60 which are positioned opposite corresponding upper and lower V-groove 54 and 56 respectively, forming in combination, upper and lower raceways. Upper and lower rows of rollers 62 and 64, respectively, roll in corresponding upper and lower raceways with the upper rollers 62 rotating about axes of rotation 80 and the lower rollers 64 about axes of rotation 82 with each of the corresponding two axes being orthogonal and each forming an acute angle of 45° with the vertical line 84 along the interface between inner ring 50 and outer ring 52. Inner ring 50 is fastened to an upper superstructure frame 66 by means of bolts (not shown) passing through regularly, circumferentially spaced bolt holes 78 in inner ring 50 the thread ends of which register with and engage aligned threaded holes 68 in superstructure frame 66. Similarly, outer ring 52 is affixed to a base frame 70 by means of bolts passing through aligned regularly, circumferentially spaced bolt holes in both the base frame 70 and the outer ring 52 and engaging internal threads 74 in the holes in the outer ring 52. The outer ring bolt holes 72 are the same diameter as bolt holes 78. A plurality of external gear teeth 76 are integrally formed around the outer periphery of the outer ring 52. Both the inner ring 50 and the outer ring 52 are made of high impact resistant nickel base alloy, a material not commonly used for such rings. Due to the low-operating temperatures for which the present invention is designed, steel which is normally used, is too brittle.

Figure 6:
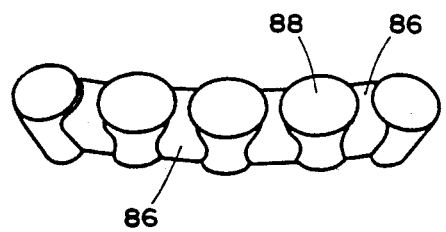
FIG. 6 is a partial view showing the rollers and spacers.

The rollers 88 in each row are spaced apart from each other by bronze spacers 86 as seen in FIG. 6. Although such spacers, ordinarily made of plastic or nylon, are used in other applications such as in machine tools, radar antennas, robot swivels and medical applications they have not hitherto been applied to large slew ring bearings for heavy equipment. The conventional spacers used in the latter applications have been made of single strip plastic belting or injection molded box-like shaped material. Moreover, although bronze bearing cages are known for use on standard high quality bearings for machine tools and other similar applications they have not been applied to larger slew ring bearings for heavy equipment. Thus, the combination of the use of bronze and the shape or design of the spacer or design of the spacers of FIG. 6 for the present application are believed to be novel. They have proven to be stronger, more wear resistant and better lubricators than the known plastic or nylon bearing retainers in use. The rollers themselves are crowned with a diameter at the center greater than that at the ends. The amount of crowning is approximately equivalent to an arc described from one roller end to another by a 200 to 400 inch radius. Such crowning prevents stress concentration developing at the ends.

Figure 7:
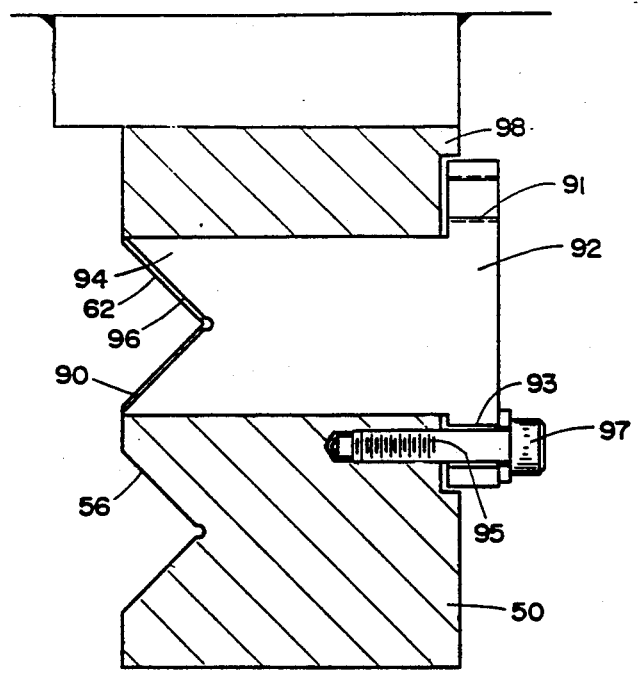
FIG. 7 is a sectional view showing the inspection port for the upper row of rollers.
Figure 8:
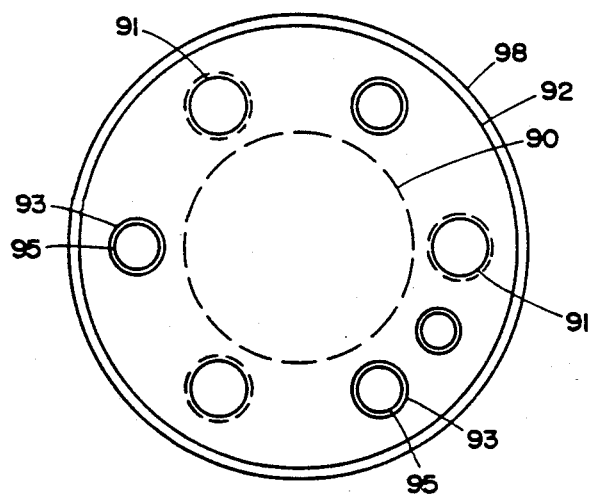
FIG. 8 is an elevation view of the inspection port flange of the part of FIG. 6.

Referring to FIG. 7, there is shown the structure of the inspection port for the upper row of roller bearings 62. That for the lower row of roller bearings 64 is identical. A horizontal bore or hole 90 passes through the wall of the inner ring 50 opening to the upper V-groove 62 and extending substantially across the entire width of the V-groove as measured from corner to corner along the vertical interface line 84 (see FIG. 5). During operation a slidable plug 94 having an end 96 with a V-groove identical to V-groove 62 is inserted so that V-groove surface 96 mates with V-groove surface 62 to providing a smooth continuous raceway surface. A flange 92 covering the hole 90 is bolted by bolts 97 passing through clearance holes 93 and registering with threaded holes 95 in inner ring 50. Flange 92 is integral with plug 94. Jacking screw holes 91 are provided in the flange which is integral with the plug 94 to enable the plug 94 to be jacked out by means of jacking screws (not shown) threaded by engaging jacking screw holes 91 and abutting recessed surface 98.

Evaluation of the design of FIGS. 2 and 3 shows that bearings 28 in the top horizontal row absorb downward vertical thrust caused either by downward loads or by overturning or tipping forces applied to the inner ring 22. The rollers 30 having a vertical axis of rotation absorb radial forces while the bottom row of rollers 32, also having horizontal axes of rotation, absorb upward vertical thrusts caused by overturning or tipping forces applied to the inner ring 22. Thus, there is no force sharing among rollers of other than forces due to tipping moments in which case only rollers on one half of both the upper and lower rollers 28 and 32 absorb force.

Moreover, the use of substantially box shaped nylon or plastic spacers having openings to receive the rollers has been found to be an unsatisfactory spacer both due to their design as well as to the deficiencies in the nylon or plastic materials.

A third problem with the structure of FIG. 3 lies in the maximum limit of size that the rollers have. Because of the limited space between rings available for rollers, the fact that the structure of FIG. 3 uses 3 rows of rollers and the further fact that the intermediate row 30 is offset from the region between the other two rows, the rollers 28, 30 and 32 cannot be designed to be as large as they might be if other designs were chosen.

Ideally the rollers should be as large as possible. The width of inner ring 22 taken up by the rollers also limits the diameter of bolts 39 that can be used. The larger the latter diameter, the less will be the distortion of the inner ring.

As can be seen from the sampling of designs available in FIG. 4, selection of the best from the large number of designs available for the particular conditions of large overturning forces, large radial forces, differing loads characterized by shock and vibration, the extremes of cold, wind, dust and rapid weather changes is not clear. A design as in FIG. 5 was selected for several reasons. It provides sharing between rows of rollers 62 and 64 of radial and vertical loads. The fact that there are only two rows rather than three translates into more space available for increasing roller size and hence increased load carrying capacity. The fact that there is no intermediate row of rollers allows larger bolt holes 78 to be used in clamping the inner ring 50 to the superstructure 66 and resultant lower distortion of the inner ring 22. The fact that there are fewer rows of rollers and fewer rollers in each row than the design of FIGS. 2, 3, 4G and 4H means that the present design is statistically more reliable than that of the FIGS. 2, 3, 4G and 4H.

Provision of inspection ports for each row of rollers allows for periodic inspection without significant machine down time. Moreover, damage in the rollers and other damage with the spacers and raceways can be detected before it leads to cessation of operation failure. Replacement of such components can be scheduled at a convenient time rather than having a failure shut down production without warning for days. By making the diameter of the inspection hole slightly larger than the width of the associated V-groove it is possible not only to inspect each roller over its entire surface but also to extract any rollers that in any way show signs of distress without disassembling the entire superstructure 66.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A ring bearing, comprising:
   (a) an inner ring;
   (b) an outer ring concentric with said inner ring;
   (c) upper and lower raceways formed around the interface between said inner and outer rings;
   (d) a plurality of rollers positioned in said upper and lower raceways so as to permit rotation of said inner ring relative to said outer ring; and
   (e) an inspection port formed in one of said inner and outer rings radially directed and intercepting one of said upper and lower raceways.

2. A ring bearing according to claim 1, wherein said rollers are separated from one another by bronze spacers, one spacer being positioned between each adjacent pair of rollers.

3. A ring bearing according to claim 1, wherein the diameter of said inspection port is equal to the width of said one raceway and including a plug slidably removably insertable into said port and having an end surface which forms a continuous surface with the surface of said one raceway.

4. A slew ring bearing for rotatably supporting a large operating superstructure of an item of heavy equipment over a base frame, comprising:
   (a) an inner ring;
   (b) an outer ring concentric with said inner ring;
   (c) an upper and lower V-groove formed in an outer cylindrical face of said inner ring and corresponding upper and lower V-grooves formed on an inner cylindrical face of said outer ring positioned opposite corresponding upper and lower V-grooves on said inner ring so as to form in combination therewith associated upper and lower roller raceways;
   (d) a plurality of rollers positioned in said upper and lower raceways rotatable so as to permit rotation of said outer ring relative to said inner ring;
   (e) a pair of inspection ports each radially directed so as to intersect a respective one of said upper and lower raceways; and
   (f) a pair of plugs each matingly slidably insertable in a corresponding one of said inspection ports and having an end which forms a continuous surface with said raceway when fully inserted.

5. A slew ring bearing according to claim 4, including a bronze spacer between each adjacent pair of rollers.

6. A slew ring bearing according to claim 4, wherein said rollers are substantially cylindrical with a crown formed thereon in which the diameter decreases gradually from the center to the ends thereof by an amount sufficient to prevent stress concentration at the ends of said rollers.

7. A slew ring bearing according to claim 6, wherein the angle between the axes of rotation of said rollers in said upper and lower raceways is 90°.

8. A slew ring bearing according to claim 7, wherein the angle between the axis of rotation of each said rollers in the axis of said rings is 45°.

9. A slew ring bearing for rotatably supporting a large operating superstructure of an item of heavy equipment over a base frame, comprising:
   (a) an inner ring;
   (b) an outer ring concentric with said inner ring;
   (c) gear teeth formed on one of an outer cylindrical surface of said outer ring and an inner cylindrical surface of said inner ring, the one ring on which said gear teeth are formed being affixed to a lower stationary base frame and the other of said rings attachable to a bottom of said superstructure;
   (d) an upper and lower V-groove formed in an outer cylindrical face of said inner ring and corresponding upper and lower V-grooves formed on an inner cylindrical face of said outer ring positioned opposite corresponding upper and lower V-grooves on said inner ring so as to form in combination therewith associated upper and lower roller raceways;
   (e) a plurality of rollers positioned in said upper and lower raceways rotatable so as to permit rotation of said outer ring relative to said inner ring;
   (f) a pair of inspection holes perpendicular to said inner ring axis of rotation and each extending from an inner peripheral surface of said inner ring to an associated one of said upper and lower V-grooves and opening thereto, the diameter of said holes being substantially equal to the width of said V-groove, and including a pair of plugs having respective V-grooves at one end thereof matching in cross section respective associated upper and lower V-grooves and each slidably removably insertable into associated inspection holes to a position in which said plug V-grooves and respective corresponding upper and lower V-grooves form a continuous surface, and flange means affixed to each of said plugs having inner ring affixing means and jacking screw holes for plug removal.

10. A slew ring bearing according to claim 9, including a plurality of bronze spacers, one positioned between each pair of adjacent rollers wherein each spacer has opposite roller contacting surfaces which conform to the shapes of said rollers.

11. A slew ring bearing according to claim 9, wherein said bearing rings are a high impact resistant nickel base alloy.

12. A slew ring bearing according to claim 9, wherein the axes of rotation of rollers in said upper raceway are directed downwardly and inwardly of said inner ring and intersect the axis of rotation of said inner ring forming an upper acute angle and the axes of rotation of rollers in said lower raceway are directed upwardly and inwardly of said inner ring and intersect the axis of rotation of said inner ring forming a lower acute angle equal to said upper acute angle.

13. A slew ring bearing according to claim 9, wherein a cylindrical surface of each roller is crowned having a diameter which continuously decreases from its center to its ends with the total change in diameter equivalent to that provided by an arc contacting the ends and center having a radius of curvature between 200 and 400 inches.

* * * * *